(No Model.)

F. A. WESTBROOK & W. S. COOK.
CAR COUPLING.

No. 320,314. Patented June 16, 1885.

Witnesses.
R. F. Gardner
L. L. Burket,

Inventors.
F. A. Westbrook
W. S. Cook,
per F. A. Lehmann,
atty.

UNITED STATES PATENT OFFICE.

FRANK A. WESTBROOK AND WINFIELD S. COOK, OF PORT JERVIS, NEW YORK.

CAR-COUPLING.

SPECIFICATION forming part of Letters Patent No. 320,314, dated June 16, 1885.

Application filed May 9, 1885. (No model.)

*To all whom it may concern:*

Be it known that we, FRANK A. WESTBROOK and WINFIELD S. COOK, of Port Jervis, in the county of Orange and State of New York, have invented certain new and useful Improvements in Car-Couplings; and we do hereby declare the following to be a full, clear, and exact description of the invention, such as will enable others skilled in the art to which it pertains to make and use it, reference being had to the accompanying drawings, which form part of this specification.

Our invention relates to an improvement in car-couplings; and it consists in the combination of the draft-rod with a nut which has its outer edge formed into ratchet-teeth, swivel bearing-plates between which the pawl is pivoted, an inclined bearing-surface which is secured to the under side of the draft-timbers of the car, and upon which the beveled end of the pawl bears for the purpose of operating the nut, as will be more fully described hereinafter.

The object of our invention is to provide an automatically-tightening nut which takes up all wear between the moving parts of the coupling, and the weakening of the springs, and thus prevents not only the nut from working loose, but from allowing the draft-rod more than sufficient play.

Figure 1:
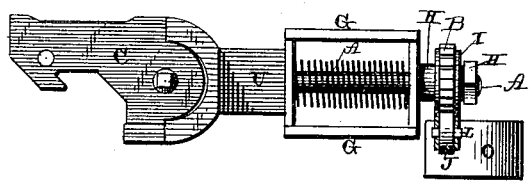
Figure 2:
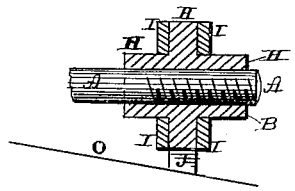
Figure 3:
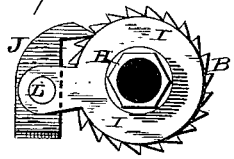

Figure 1 is an inverted view of a device embodying our invention. Fig. 2 is a vertical longitudinal section through the nut. Fig. 3 is a side elevation of the same.

A represents the draft-rod of the car-coupling, to the rear end of which the nut B is applied in the usual manner. The draft-rod is connected to the draw-head C and passes through the casing U and the follower-casting G and the springs placed therein. The nut B is provided with a hub or an extension, H, upon each of its sides, and applied to opposite sides of this nut and to the hubs are bearing-plates I, between which the pawl J is pivoted. The pivot L, upon which the pawl is placed, is provided with shoulders at each end for the purpose of preventing the bearing-plates from being fastened together. These plates, carrying the pawl with them, can be freely revolved around the nut. The outer edge of the nut B is formed into ratchet-teeth, as shown, and the pawl engages with these teeth for the purpose both of preventing the nut from turning backward and to force the nut forward to tighten it in place. The outer end of this pawl is beveled, as shown, where it comes in contact with the inclined bearing-surface O, which is secured to the under side of the car or other suitable support. When any wear takes place between the various moving parts of the couplings, if there is no means of taking up the nut, the draft-rod has a greater endwise movement or play than is desirable. The more play the rod has the more liable the nut or key is to work loose, and thus allow the parts of the coupling to be pulled out. Should any wear between the parts take place, or the springs become weakened, the rod obtains a greater play than is necessary, and either the nut works loose or, if a key, it is liable to be cut into. To obviate all this trouble is the object of our invention. Whenever the cars run together, or the draft-rod is given an endwise movement, the outer end of the pawl is forced backward upon the inclined bearing-surface O, and this pawl and the plates between which it is held are forced directly around. If the wear between the parts has been but very slight, or the springs have not weakened, the rod will be forced backward over the inclined bearing-surface O a very slight distance, in which case the pawl does not move the nut, but simply serves to prevent the nut from moving backward. If wear between the moving parts has taken place, or the springs have become weakened, the rear end of the rod is forced backward over the inclined bearing-surface O a greater distance than it otherwise would be, and then the end of the pawl bearing upon the inclined surface causes the pawl to force the nut around one or more teeth, thus tightening it in position. This movement of the nut only takes place when there has been a sufficient wear upon the moving parts, or the springs have become more or less weakened.

Although this invention is especially adapted for car-couplings, it may be used in other connections where an endwise-moving rod which is held by a nut at one end is used. We do not limit ourselves in regard to the details of the construction here shown, for they may be changed without departing from the spirit of our invention.

Having thus described our invention, we claim—

1. The combination, of an endwise-moving rod with a nut which is placed thereon, and which has its outer edge formed into ratchet-teeth, with a pawl which is made to operate in connection with the nut, and an inclined surface for operating the pawl, substantially as shown.

2. The combination of the draft-rod, the nut which is applied to its end, the bearing-plates, the pawl, and the inclined surface for operating the pawl, substantially as set forth.

In testimony whereof we affix our signatures in presence two witnesses.

FRANK A. WESTBROOK.
WINFIELD S. COOK.

Witnesses:
E. VAN HORN,
D. M. SEWARD.